(12) United States Patent
Potdevin

(10) Patent No.: US 6,447,249 B2
(45) Date of Patent: Sep. 10, 2002

(54) ROTOCRAFT ROTOR WITH FOLDING BLADES AND DEICING ELECTRICAL CONNECTION INSTALLATION

(75) Inventor: François Potdevin, Ventabren (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/876,466

(22) Filed: Jun. 7, 2001

(30) Foreign Application Priority Data

Jun. 8, 2000 (FR) .............................................. 00 07337

(51) Int. Cl.⁷ .............................................. B64C 27/50
(52) U.S. Cl. ................ 416/143; 416/210 R; 416/210 A
(58) Field of Search ................................ 416/142, 143, 416/220 R, 210 R, 210 A; 244/17.11, 134 D

(56) References Cited

U.S. PATENT DOCUMENTS 3,612,444 A * 10/1971 Girard ........................ 244/207
4,915,585 A 4/1990 Guimbal
5,769,606 A 6/1998 Mondet
6,036,442 A 3/2000 Certain
6,216,979 B1 4/2001 Faure et al.
6,331,099 B1 * 12/2001 Eccles et al. ................ 416/142

FOREIGN PATENT DOCUMENTS

DE    199 22 153-A 1    * 11/2000

* cited by examiner

Primary Examiner—Edward K. Look
Assistant Examiner—Ninh Nguyen
(74) Attorney, Agent, or Firm—Piper Rudnick; Michael L. Kenaga

(57) ABSTRACT

On the folding-blade rotor, an outer radial length of an electric cable for connection between the hub and a blade has a part forming spare length and wound into an S-shape around two reels each mounted at the end of one of the two blade pins that connect the blade root to the cuff connecting the blade to the hub. The withdrawal of at least one pin with its reel releases a portion of the part forming spare length and allows the blade to be folded without disconnection at the ends of said electrical connecting cable.

10 Claims, 8 Drawing Sheets

ROTOCRAFT ROTOR WITH FOLDING BLADES AND DEICING ELECTRICAL CONNECTION INSTALLATION

BACKGROUND OF THE INVENTION

The invention relates to a rotorcraft rotor in which the blades are, at least some of them, folding blades and equipped with an electric deicing or anti-icing device, entailing the routing of electrical energy to the blades from a collector placed at the centre of the hub of the rotor. This routing of electrical energy is performed using an electrical connection installation consisting essentially of an electric wiring harness and comprising, for each blade, at least one electric connecting cable connected to a member for connecting the corresponding blade to the hub of the rotor and equipped with connectors at its ends in order to make an electrical connection between the collector and the blade.

More specifically, the invention relates to a rotorcraft rotor, particularly a helicopter main rotor, of the type comprising:
- a hub intended to be driven in rotation about an axis of the hub which is the axis of rotation of the rotor,
- at least three blades, each of which is connected to the hub by a connecting member which is substantially radial with respect to the axis of rotation, and the outer radial end of which is shaped as a clevis in which the corresponding blade has its root retained by two blade pins each passing through aligned bores in the clevis and the blade root, the two blade pins being substantially mutually parallel, at least one blade being foldable on one side of the rotorcraft and having at least one removable blade pin, so that withdrawal of said removable blade pin from the blade root and from the clevis of the connecting member allows the blade to be pivoted about the other blade pin, and
- an electrical connection installation comprising, for each blade, at least one electrical connecting cable connecting a first connector, carried by the hub and powered by at least one supply conductor, to a second connector mounted on the blade and connected to at least one electric conductor of an electric device for deicing or preventing the icing of said blade.

Rotorcraft rotors of this type are known, in particular, from EP 0 754 623 and FR 2 781 198.

For at least one folding blade of a rotor according to EP 0 754 623, the connecting cable comprises a first length, radially towards the outside, arranged as an overhead hook stretching from this blade to the corresponding connecting member and connecting the second connector on this blade to a first end, in an outer radial position, of a second length of connecting cable held substantially radially on this connecting member.

This overhead hook of the connecting cable has a rounded cross section, possibly a screened structure, and is connected to a plug of the second connector, which plug connects to a socket of this second connector, this socket being fixed to the blade and connected to the deicing conductor for this blade.

When a blade is folded, the pivotings of the blade root in the outer radial clevis of the corresponding connecting member may introduce damaging tension into the overhead hook and the second length of the connecting cable and into the second connector and/or this overhead hook may oppose the full folding of the blade.

To remedy this drawback, EP 0 754 623 makes provision for the plug of the second connector, on the corresponding end of the overhead hook of the connecting cable, to connect removably to the socket of the second connector, which is fixed to the blade. Giving this overhead hook a long enough length to allow the full folding of the blade without disconnecting the plug and socket of this connector is not advisable because an overhead hook of such a length would be subjected to significant forces and would undergo fairly high-amplitude whiplash movements encouraging it to catch unintentionally on nearby components, such as pendular blade root antivibrators or drag dampers, on a rotating rotor, the corresponding blade then making its angular excursions in pitch, flapping and drag.

If the blades are folded manually, it is therefore not possible to avoid manual disconnections and connections between the plug and the socket of the second connector, the former before folding and the latter after returning a blade to a flight configuration, if the advantages afforded by the other characteristics of the connection installation described in EP 0 754 623 are to be maintained.

By contrast, on a rotor whose blades can be folded "automatically", using actuators mounted on the connecting members, EP 0 754 623 proposes for the overhead hook between the blade and the connecting member to extend from the second connector, on the blade, to a rotating part of a rotary coupling, of which a stationary part, on the connecting member, is connected to the second length of cable held thereon, the rotating part of the rotary coupling being mounted to rotate coaxially with the pivoting connection between the blade and the connecting member so that the automatic foldings and unfoldings of the blade can be brought about without disconnections or connections having to be performed at either of the two connectors of the installation.

FR 2 781 198 proposes improvements to folding-blade rotors with the electric deicing installation according to EP 0 754 623, particularly in order to diminish the stresses and/or displacements of the connecting cable in its overhead hook length connecting the connecting member to the second connector on the blade when the rotor is turning and during operations of folding the blades back and forth.

To this end, according to FR 2 781 198, part of this overhead hook is held in at least one retaining member mounted in the substantially axial continuation of the folding axis. This technical step affords the following advantages: it is no longer necessary for the connection between the overhead hook and the deicing device to be disconnected at the second connector before the blade is folded and when this overhead hook is of a relatively short length. The retaining member thus prevents displacements of this overhead hook on each side of the folding axis, during the folding or unfolding of the blade, thus avoiding prejudicial twisting of this length of the connecting cable, provided that this overhead hook is long enough, and in order for this overhead hook of the connecting cable to itself adopt the position in which it is mechanically stressed the least, when a blade is being folded or unfolded, the retaining member can be mounted so that it swivels freely coaxially on the axis of folding.

Whether this rotating member is fixed or whether it swivels on the folding axis, it may be arranged as a fork in which an elongate part of this overhead hook, with a cross section substantially in the shape of a flattened rectangle, is engaged and held by at least one elastic tab.

However, the improvements proposed in FR 2 781 198 are not enough to avoid disconnections and connections between the connecting cable and the second connector on the blade during manual foldings and unfoldings of the blades when the foldings are performed using a manual folding device as described in EP 0 888 964.

What happens is that, to fold manually a folding blade, the two blade pins of which are removable, the device according to EP 0 888 964 comprises a removable spacer piece which spaces the root of the folding blade away from the corresponding connecting member, the spacer piece comprising a journal through which a first bore passes and a clevis with a second bore, the spacer piece being, once a first blade pin has been withdrawn and the blade has been pivoted with respect to the connecting member and about the second blade pin, able to be mounted in terms of rotation on the connecting member by the retaining of the spacer piece journal in the clevis of the connecting member using a pin (tooling) that can be engaged in the first spacer piece bore and in the bore, previously containing the first blade pin, of the clevis of the connecting member, and the spacer piece being capable of retaining the blade root in terms of rotation in the spacer piece clevis by engaging another pin in the second bore of the spacer piece and in the bore of the blade root which previously contained the first blade pin, so that, once the second blade pin has been withdrawn, the blade can be folded by pivoting its root in the spacer piece clevis and by pivoting the spacer piece via its journal in the clevis of the connecting member.

As described in EP 0 888 964, a folding device such as this with a removable spacer piece attached between the outer radial clevis of the connecting member and the root of the blade makes it possible to offset and also to incline the axis of pivoting of the folding blade, and therefore allows better control over the paths followed by the blades upon folding to prevent them from interfering with one another and with members associated with them, such as drag dampers, and also, in the folded position, to give them a more favourable position with respect to the fuselage and with respect to the tail boom of the helicopter and with respect to the wind.

However, as far as the deicing connecting cable is concerned, the drawback of such a folding device is that it is incompatible with a fixed-length electrical connection between the connector on the blade and the connector on the hub because this device moves the blade away from the connecting member and furthermore does not allow the use of members for retaining the overhead hook of the deicing connecting cables as proposed in FR 2 781 198, that is to say in the shape of forks, as mentioned previously, or in the shape of cylindrical casings coaxial with the axis of folding and consisting of two half-casings containing a length of at least one turn of this length of cable between the connecting member and the blade, an end part of this length passing through a half-casing secured to the bottom of the casing and fixed to this half-casing and a second end part of this length passing through the other half-casing which is mounted to rotate freely coaxially with the axis of folding on the half-casing of the bottom, fixed to the connecting member, as also described in FR 2 781 198.

The withdrawal of the blade pins and therefore of the retaining members they support, on the one hand, and the separation of the folding blade root from the connecting member, by the fitting of the spacer piece, on the other hand, mean that it is not possible to avoid disconnecting the connecting cable and the second connector in order to fold a blade equipped with a deicing connecting cable as described in EP 0 754 623 and FR 2 781 198, thus leaving the blade entirely free to move without the risk of pulling the second connector out.

However, this simple solution consisting in disconnecting the connecting cable from the second connector on the blade has two major drawbacks.

From the mechanical point of view, the repeated operations of connecting and disconnecting present high risks of quickly damaging the connection installation through premature wear of the second connector and/or by pulling out its connecting base fixed to the blade. These risks are exacerbated by the arduous operating conditions in which a connection/disconnection intervention has to be able to be performed, particularly poor weather conditions entailing the operators wearing thick gloves, and adopting uncomfortable positions, particularly when carrying out operations on a helicopter on board a ship.

From a purely operational point of view, the forgetting to disconnect the connecting cable from the second connector cannot be excluded, this leading to the socket of the latter or a connector support casing bonded to the blade being pulled out. In addition, this disconnection manipulation needed for folding a blade adds to the numerous other operations, particularly the fitting of the removable spacer piece for folding, and increases the complexity and total duration of the intervention during folding.

The problem underlying the invention is that of overcoming these drawbacks by avoiding disconnecting of the connecting cable and the second connector on the blade so that the latter can be folded, even when the rotor is equipped with a folding device with a removable spacer piece that is inserted between the blade root and the corresponding connecting member.

SUMMARY OF THE INVENTION

To this end, the rotorcraft rotor according to the invention, of the type set out hereinabove, is characterized in that the connecting cable for at least one folding blade comprises a first length connecting said second connector on said folding blade to a first end, in an outer radial position, of a second length, held on the corresponding connecting member of said connecting cable, said first length of which includes a part forming spare length and wound into an S-shape in a plane substantially perpendicular to the corresponding two blade pins around two reels each of which is mounted at the end of a respective one of the corresponding two blade pins so that withdrawal of at least one removable blade pin and of the corresponding reel releases at least a portion of said part forming spare length of said first length, allowing the blade to be folded back without disconnection at the second connector.

Thus the spare or excess length exhibited by the connecting cable between the second connector, on the blade, and the corresponding connecting member, is automatically released, at least partially, during the folding operation, allowing the blade to travel.

When the folding blade has both blade pins as removable pins and can be folded manually with the aid of a folding device of the type known from EP 0 888 964, with a removable spacer piece which spaces the blade root away from the corresponding connecting member, as explained hereinabove, it is clear that once the first blade pin and its reel have been withdrawn, to mount the spacer piece in terms of rotation on the connecting member using a tooling pin, and once the second blade pin and the corresponding reel have been withdrawn following the mounting of the blade root in terms of rotation in the spacer pin clevis by engaging another tooling pin, the blade can be folded by pivoting its root in the spacer piece clevis and by pivoting the spacer piece via its journal in the clevis of the connecting member, while the part forming spare length on the corresponding first length of the connecting cable is completely released by the aforementioned successive withdrawal of the two reels with the corresponding two blade pins.

Advantageously, to allow great deformations of the first length of the connecting cable during the blade-folding operation, this first length has, at least in its part forming spare length, a cross section which is substantially in the shape of a flattened rectangle, the largest dimension of which is substantially parallel to the blade pins, and therefore generally also to the axis of the rotor.

Such a first length of connecting cable advantageously collaborates with the corresponding second length when the latter, as known from EP 0 754 623 and FR 2 781 198, and for the reasons mentioned in those two documents, has an elongate part with a cross section substantially in the shape of a flattened rectangle, the largest dimension of which is directed substantially at right angles to the largest dimension of the substantially flattened rectangular cross section of the part forming spare length of the first length of cable, that is to say generally also substantially perpendicular to the axis of the rotor, particularly to make it easier for this second length of cable to be attached to the connecting member, to reduce aerodynamic drag and to lower the mechanical loadings exerted on this length of cable.

Advantageously, for a better connection between the first and second lengths of the connecting cable, this second length extends on the corresponding connecting member, in a direction that is inclined with respect to the longitudinal axis of this connecting member and in such a way that its first end, in an outer radial position, is laterally offset outwards, on the same side as that one of the two reels which has wrapped around it the portion of said part forming spare length to which said second length of connecting cable is connected.

Advantageously, to reduce the number of rotor parts and to make the blade pins and the reels easier to operate and to allow the part forming spare length to wind readily into an S-shape, each reel, of cylindrical overall external shape, is secured to a respective one of the two blade pins.

Advantageously in addition, each of the two reels has, at its end on the opposite side to the blade pin on which said reel is mounted, a rim projecting substantially radially towards the outside of said reel and which restrains said part forming spare length and wound in an S-shape, between the rims of the reels and the corresponding connecting member, against any displacement substantially parallel to the blade pins.

Thus, in the flight position, the part forming spare length of the first length of cable is held in place by the two reels which doubly restrain this length of cable, not only in the plane perpendicular to the blade pins, in which the S-shape of the part forming spare length prevents the radial and tangential deformations of this part of the first length of cable, but also in any plane parallel to the blade pins, in which this part of the first length of cable is held between the connecting member and said rim of the reels.

In addition, each reel is advantageously tubular and secured substantially coaxially to the corresponding blade pin, which is also tubular. Thus, each reel can accommodate the head of an elastic pin passing through the corresponding tubular blade pin to lock it in a position in which it retains the blade root in the clevis of the corresponding connecting member in the flight configuration.

Thus, the rotor according to the invention can also enjoy advantages resulting from the use of other particulars of the electric connection installation according to EP 0 754 623 and FR 2 781 198, to which reference can be made for further details, and the descriptions of which are incorporated into this description by way of reference.

In particular, the second length of the connecting cable may advantageously be connected to the first connector on the hub via a third length of the connecting cable, said third length comprising an overhead hook in the shape of a flattened half loop with a cross section substantially in the shape of a flattened rectangle the largest dimension of which is substantially perpendicular to the axis of rotation and the concave face of which faces substantially towards retaining and articulating means connecting the corresponding connecting member to the hub and substantially radially towards the axis of rotation, said overhead hook being thus deformable in terms of bending and in terms of torsion so as to accommodate angular excursions in terms of pitch, drag and flapping of the blade and of its connecting member for connecting it to the hub, as known from the aforementioned two documents.

Likewise, the second length of cable may advantageously be connected to the overhead hook of the third length of cable by a coupling connected to the connecting member by a connection which is articulated at least in terms of pivoting about an axis substantially parallel to the longitudinal (pitch-change) axis of the connecting member and of the blade, so as to lessen the mechanical stresses on the connecting cable while at the same time allowing loadings exerted on the latter when the rotor is rotating and when the corresponding blade is making angular excursions in terms of pitch, flapping and drag to be reacted correctly, as proposed in FR 2 781 198.

BRIEF DESCRIPTION OF THE DRAWINGS

Other advantages and features of the invention will emerge from the description given hereinbelow, with no implied limitation, of some exemplary embodiments described with reference to the appended drawings, in which.

DETAILED DESCRIPTION OF THE INVENTION

Figure 1:
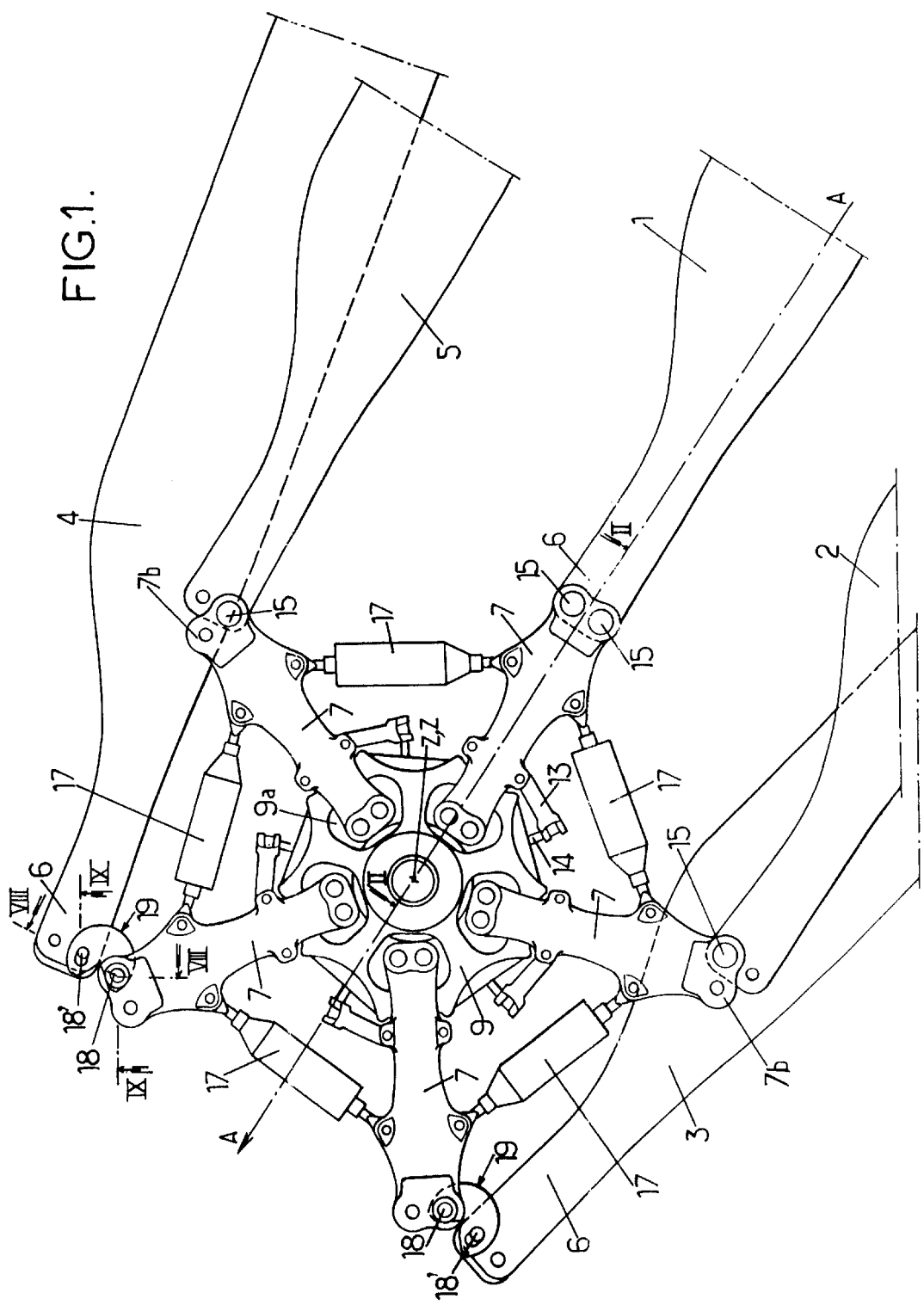
FIG. 1 is a schematic plan view of a five-bladed rotor, four of which blades are folded back, the two front blades being folded using a folding device with removable spacer piece.

FIG. 1 depicts a five-bladed helicopter main rotor of the type described in EP-A-0 340 095 and EP-A-0 888 964, to which reference can be made for further details, and the descriptions of which are incorporated into this description by way of reference.

Figure 2:
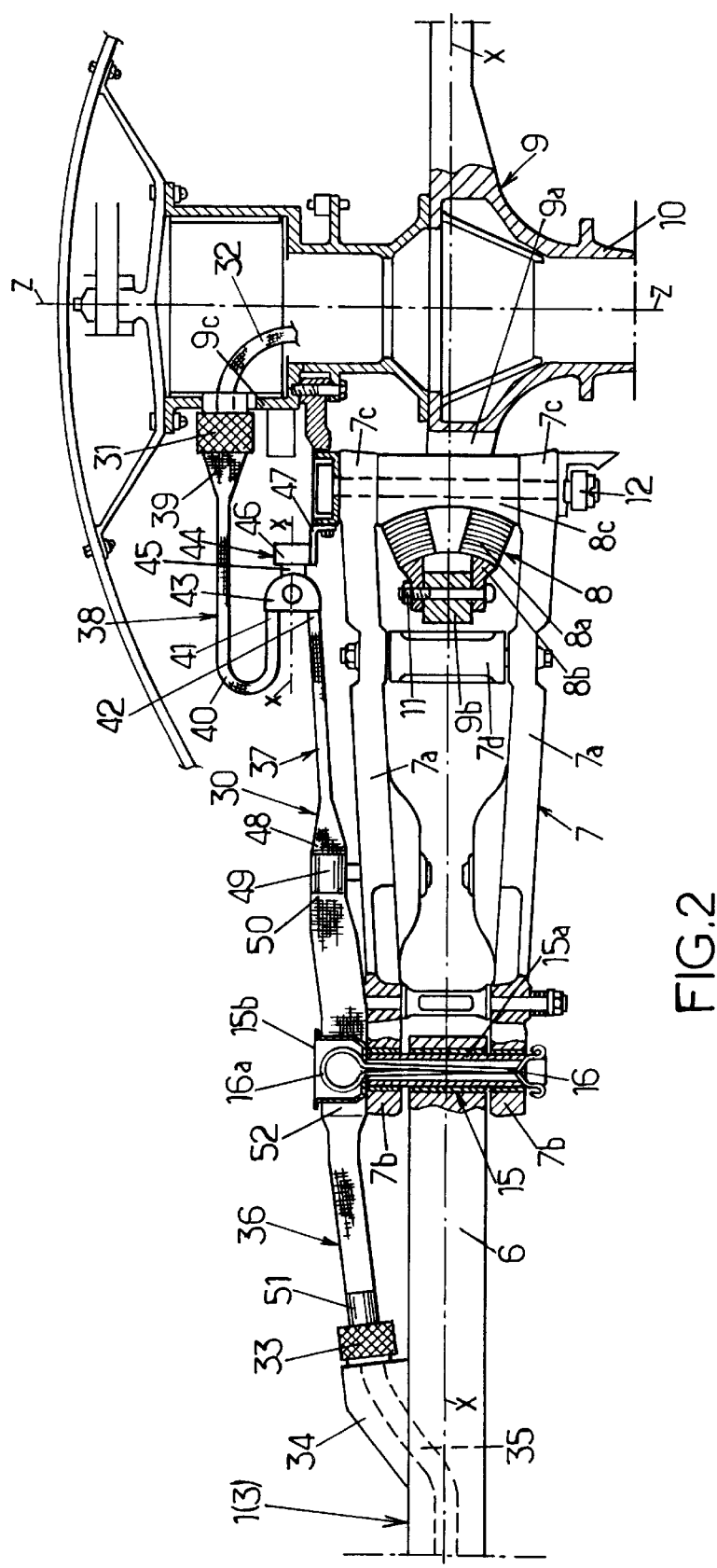
FIG. 2 is a part view in longitudinal section on II—II of FIG. 1 and depicts the connection between a blade and the hub in the flight configuration, at the unfolded rear rotor blade of FIG. 1, and the connecting cable associated with that blade in the electric connection installation powering the electric devices for deicing the rotor blades.

It is recalled that, in the flight configuration, each of the five identical blades 1, 2, 3, 4, 5 of the rotor is connected to the hub 9 of the rotor as depicted in FIG. 2, and in FIG. 1 for just the rear blade 1, which extends over the tail boom of the helicopter which means that its longitudinal pitch-change axis is substantially aligned with the longitudinal axis A—A of the helicopter (the front of which is indicated by an arrow on the axis A—A) when the rotor is stationary and the four other blades 2 to 5 are folded towards the back of the helicopter and along its tail boom, the left-hand rear blade 2 and left-hand front blade 3 being folded along the left-hand side while the right-hand front blade 4 and right-hand rear blade are folded along the right-hand side.

In the flight configuration, each of the blades 1 to 5 is retained by its root 6 in a connecting member 7, known as a cuff in the remainder of the description, and itself connected by a retaining and articulating device 8 to the hub 9 which rotates as one with a rotor mast 10 about its axis Z—Z which is the axis of rotation of the rotor.

Figure 3:
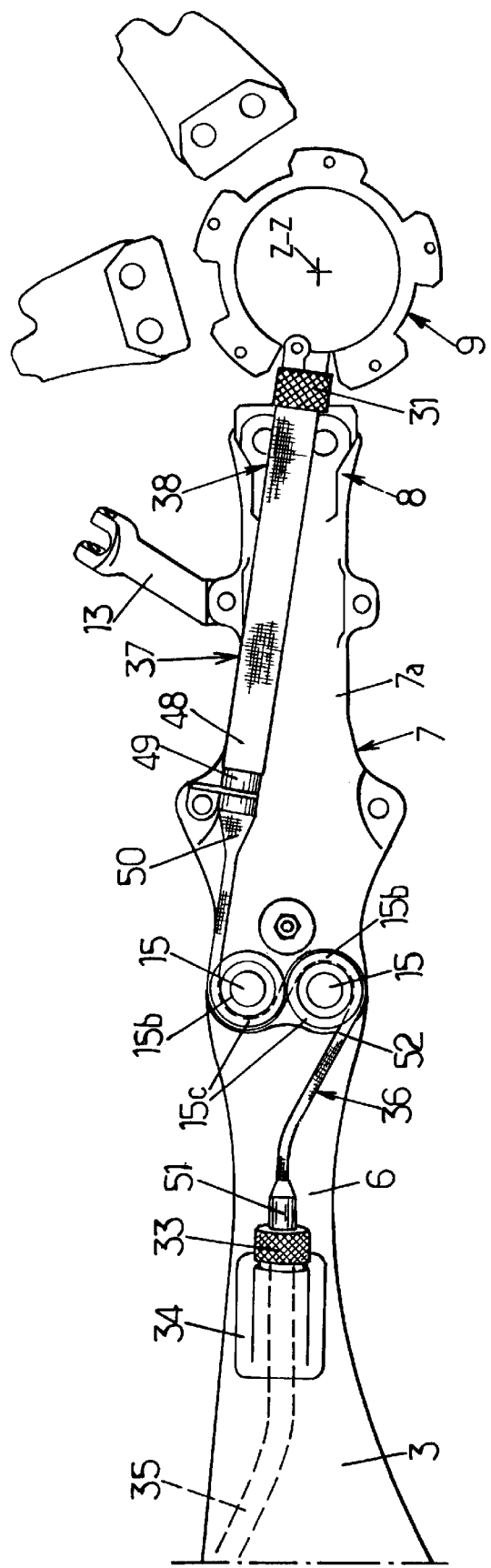
FIG. 3 is a partial schematic plan view of the part of the rotor depicted in FIG. 2, FIGS. 4 to 6 are views similar to FIG. 3 depicting a sequence for folding a blade to the left using the folding device with removable spacer piece.

In the rotor of FIGS. 1 to 3, the hub 9 is of the pocketed plate type, having, for each blade 1 to 5, an axial pocket 9a housing the retaining and articulating device 8, comprising a spherical laminated stop of a well-known type to absorb, in compression, centrifugal forces as the rotor rotates and to allow each blade and its cuff 7 to have angular excursions in terms of pitch, about the longitudinal pitch-change axis (X—X in FIG. 2) of the blade in question, in terms of flapping, about an axis of flapping perpendicular to the axes Z—Z and X—X, and in drag, about an axis of drag perpendicular to the axis X—X and substantially parallel to the axis Z—Z, the flapping, drag and pitch X—X axes being concurrent at the centre of the spherical laminated stop 8. This stop 8 comprises a central part 8a consisting of an alternating stack of rigid cups and layers of an elastomeric material, in the form of spherical caps with the concave side facing towards a radially outer armature 8b via which the stop 8 is fixed, by bolts 11, to the outer radial edge 9b of the hub plate 9, at the corresponding pocket 9a. The stop 8 also comprises a radially inner armature 8c which passes through the pocket 9a and is fixed, as a spacer piece, by two sets of threaded axial studs and nuts 12, between the two branches of a clevis 7c at the inner radial end of the cuff 7 which, in this example, essentially consists of two plates 7a kept spaced apart one above the other by spacer pieces, namely the internal armature 8c of the stop 8 and a central spacer piece 7d bolted between the two plates 7a.

Each cuff 7 carries, projecting on the leading edge side of the corresponding blade, a pitch lever 13 (see FIG. 1) articulated to a pitch rod 14 connected in a known manner to a set of swashplates (not depicted) for controlling the pitch of each blade about its pitch axis X—X.

The outer radial end of each cuff 7 is formed of a clevis 7b, with two branches between which the root 6 of the corresponding blade is held by two blade pins 15 each passing through aligned bores in the blade root 6 and in the two branches of the clevis 7b. The two blade pins 15 have their axes parallel to one another and perpendicular to the blade axis X—X, and the blade pins 15 are arranged symmetrically with respect to one another on each side of this axis X—X.

According to a technical feature specific to the invention, each blade pin 15 comprises a tubular cylindrical shank 15a passing through the branches of the clevis 7b and the blade root 6, and this shank 15a itself has passing through it an elastic pin 16 for locking the blade pin 15 in the position of retaining the blade root 6 in the clevis 7b of the cuff 7 in the flight configuration.

Each blade pin 15 is also secured to a reel 15b, of cylindrical and tubular external overall shape, with a cross section greater than that of the shank 15a and substantially coaxially extending the blade pin 15 above the upper branch of the outer clevis 7b so that the head 16a of the elastic pin 16 is housed and protected in the reel 15b. The structure and function of the two reels 15b are specified hereinbelow in conjunction with the corresponding connecting cable.

The two blade pins 15 with their reel 15b are removable once the safety pins 16 have been withdrawn, so that the blade can be removed, and such a blade can be folded manually by withdrawing one of the two blade pins 15 and pivoting the blade via its root 6 about the other blade pin 15 which is kept in position.

This conventional method of manually folding a blade is used, on the rotor of FIG. 1, for the rear left 2 and rear right 5 blades, on each side of the rear blade 1. These blades 2 and 5 are folded before the front blades 3 and 4 are folded and this is done, in the case of the left-hand rear blade 2, by withdrawing the blade pin 15 which is furthest forward, that is to say, bearing in mind the direction of rotation of the rotor (which is the clockwise direction in FIG. 1), the one closest to the leading edge of the blade 2, the latter then being pivoted backwards about the blade pin 15 situated furthest back, that is to say the one closest to the trailing edge of this blade 2. In the case of the right-hand rear blade 5, the blade pin 15 withdrawn is likewise the one situated furthest forward, therefore the one closest to the trailing edge of the blade 5, which is then pivoted back about the blade pin 15 situated furthest back, thus on the same side as its leading edge.

Each of the front left 3 and front right 4 blades are folded using a folding device as described in EP-0 888 964, and the structure and operation of which are recalled hereinbelow, to avoid interference between the leading edge of the right-hand front blade 4 and the cuff 7 of the right-hand rear blade 5, particularly at its external clevis 7b, and interference between the trailing edge of the left-hand front blade 3 and the cuff 7 of the left-hand rear blade 2 and/or one or other of the two drag dampers 17 which are mounted as inter-blade dampers, as more particularly described in EP-0-340 095, and are articulated laterally on the opposite sides of the cuff 7 of the left-hand rear blade 2.

This folding device, described schematically with reference to FIGS. 4 to 9 and as used, by way of example, in the case of the left-hand front blade 3, consists of a simple tool that is easy to produce, fit, remove and transport, essentially comprising a one-piece curved tooling spacer piece 19 fulfilling the function of a removable spacer piece for spacing the root 6 of the folding blade 3 away from the corresponding cuff 7, and of two pins, one of which is a special-purpose tooling pin 18, the geometry of which is quite similar to that of a blade pin 15 without a reel 15b, so that it can be substituted for the latter pin in a pinning function, it being possible also for the other pin to be a similar special-purpose tooling pin 18' or one of the two blade pins 15 with a reel 15b, which can be reused after it has been withdrawn to allow initial pivoting of the folding blade 3 in a first phase of the folding sequence, as explained hereinbelow.

Figure 5:
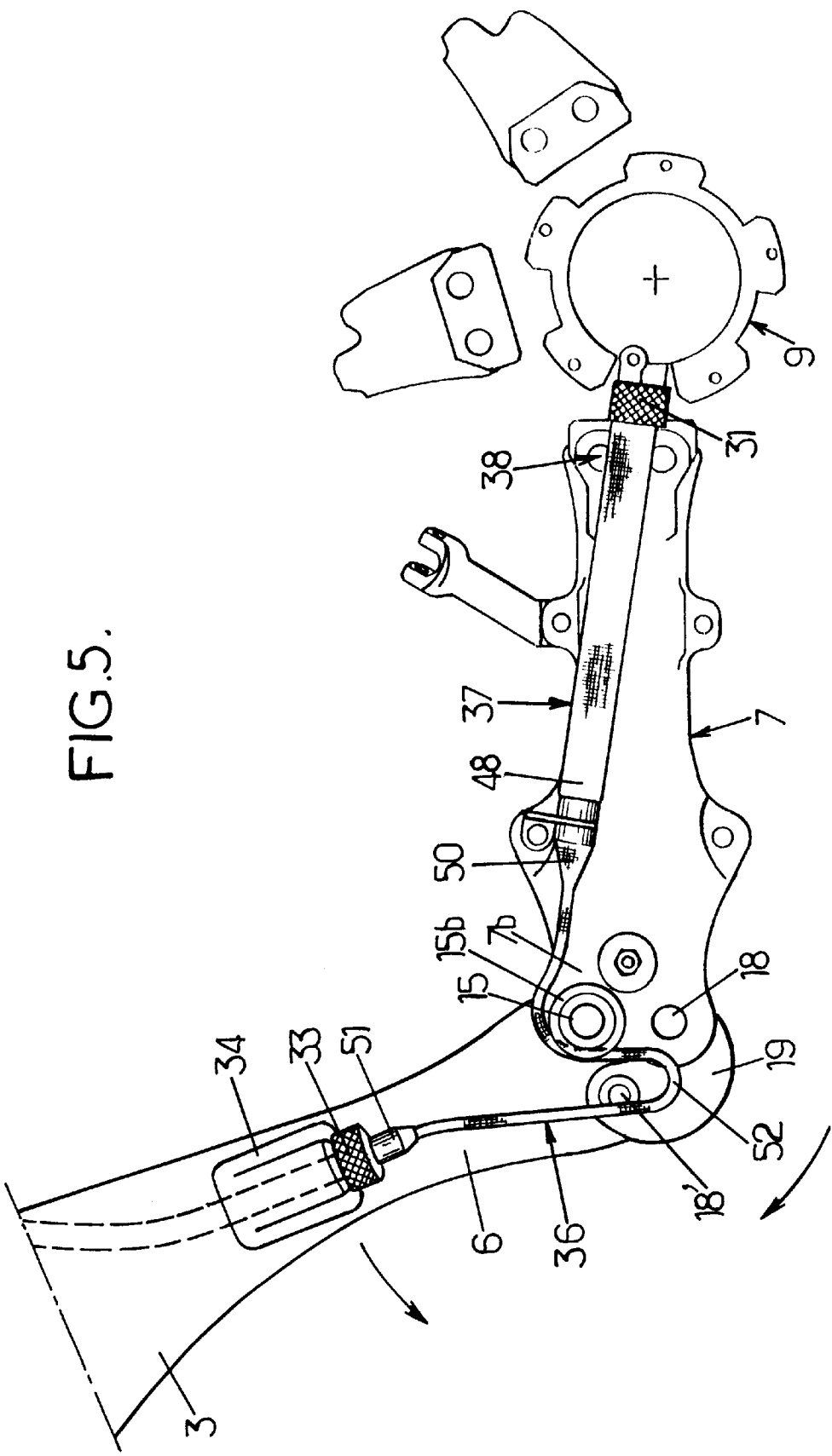
Figure 6:
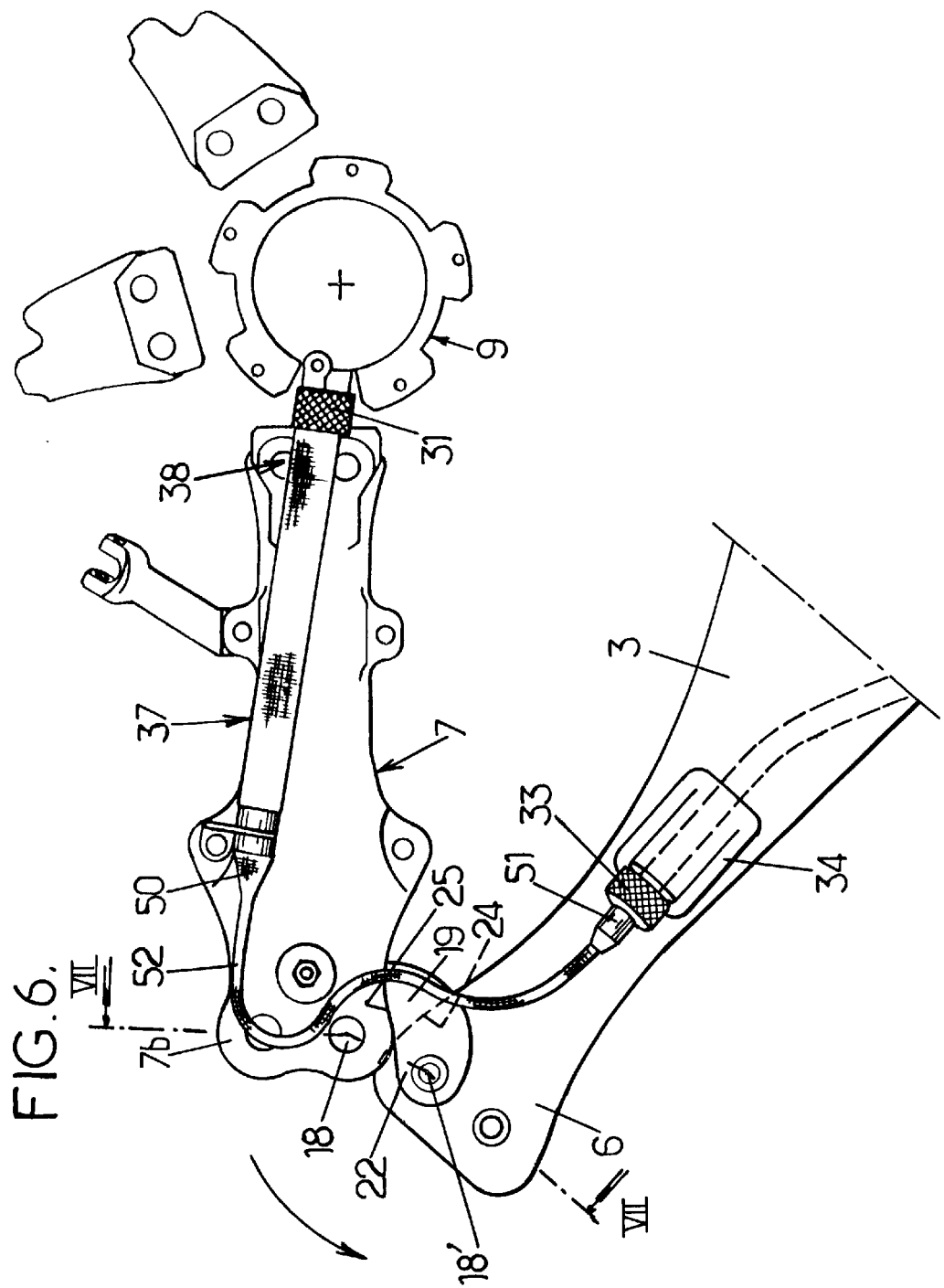
Figure 7:
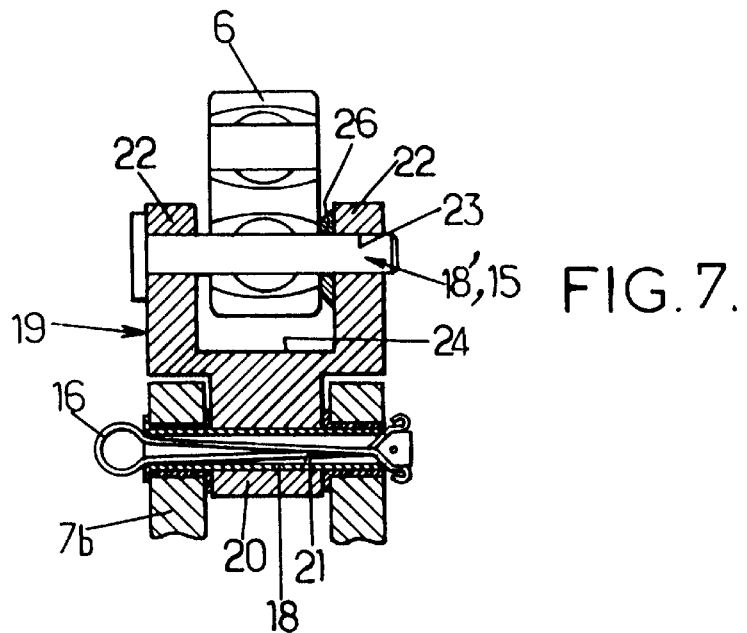
FIG. 7 is a view in section on the broken line VII—VII of FIG. 6, FIGS. 8 and 9 are views in section on the broken lines VIII—VIII and IX—IX of FIG. 1, and FIGS. 10 to 12 are schematic views similar respectively to FIGS. 4 to 6 for folding a blade to the right with a removable spacer piece.

As depicted in FIGS. 4 to 7, the spacer piece 19 has, in plan view, a curved shape in the form of a crescent or in the form of an angle bracket and comprises two end parts, one of which is configured as a journal 20 through which a first bore 21 passes and the other of which is arranged as a clevis 22, the two branches of which have a second bore 23 passing through them. The spacer piece 19 is curved in a plane substantially perpendicular to the axis of its first bore 21 and, to make the use of the device easier to understand, we shall initially consider that the two bores 21 and 23 are parallel. As the diameter of the bores 21 and 23 of the spacer piece 19 corresponds to the diameter of the two bores in the blade root 6 and of the two bores in each of the two branches of the outer clevis 7b which accommodate the two blade pins 15, and as the height of the journal 20 corresponds to that of the blade root 6 and as the separation between the two branches of the clevis 22 of the spacer piece 19 is slightly greater than the height of the blade root 6, it will be understood that the journal 20 of the spacer piece 19 can be substituted for a lateral half of the blade root 6 between the halves of the two branches of the outer clevis 7b of a cuff 7 through which a single blade pin 15 passes, and the spacer piece 19 can be mounted to pivot via its journal 20 in a half of the clevis 7b in which the journal 20 could be retained by a blade pin 15 but, for reasons explained hereinbelow, is retained by a tooling pin 18, that can be substituted for a blade pin 15 and, in practice, is produced like a blade pin 15 without a reel 15b. Similarly, the blade root 6 can be retained in the spacer piece clevis 22, possibly by a blade pin 15, but preferably, for the reasons explained hereinbelow, by a tooling pin 18', about which the blade root 6 can pivot, as shown in FIG. 7.

Figure 4:
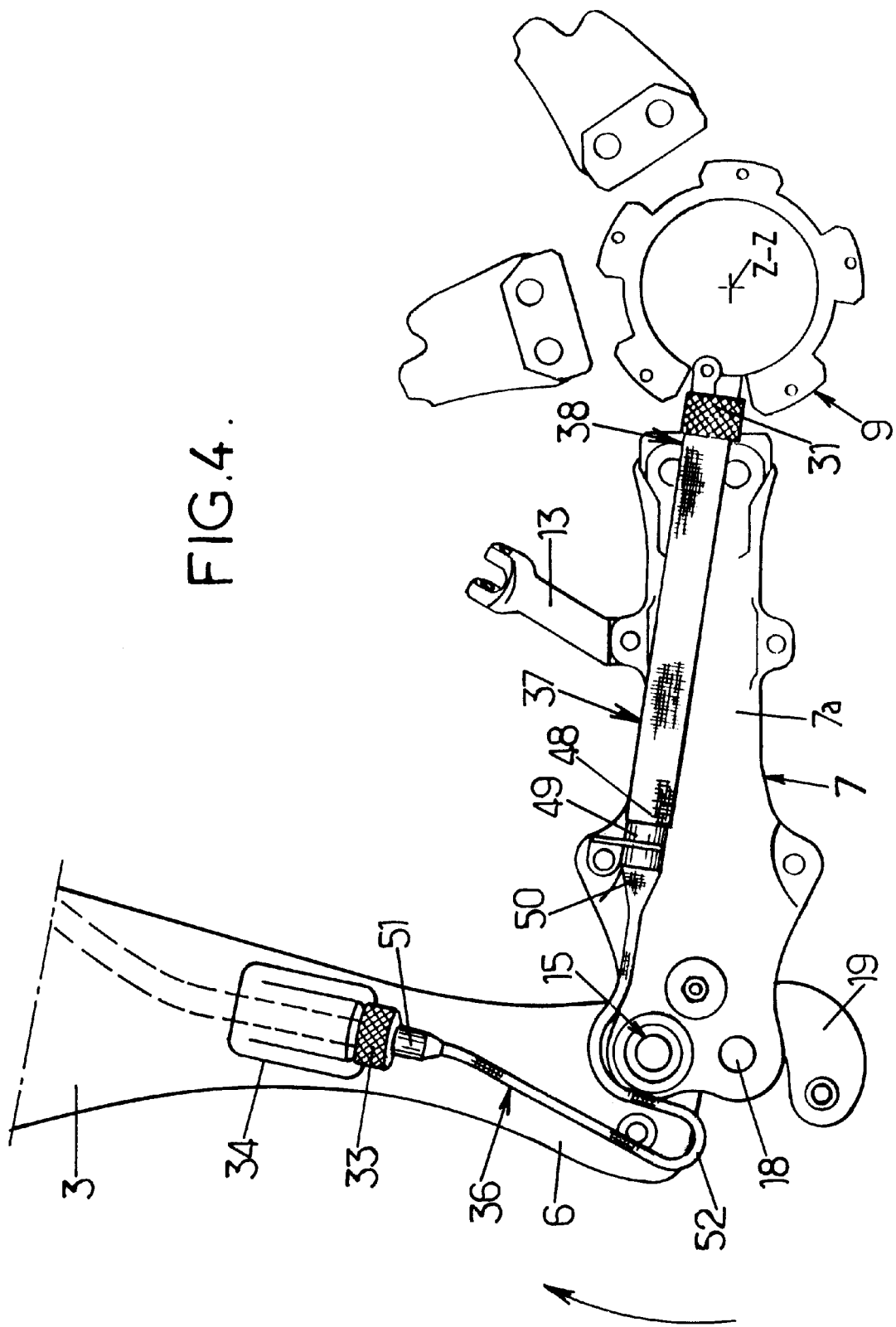

Before describing the folding of the blade 3 using this folding device and its main steps in reference to FIGS. 4 to 6, we shall now describe, with reference to FIGS. 2 and 3, the electrical connection installation with which the rotor is equipped for electrically powering an electric deicing or anti-icing device mounted on each blade from the electrical network on board the helicopter, via a rotary collector (not depicted) placed at the centre of the hub 9.

The expression "electric deicing or anti-icing device" is to be understood as meaning any device which, for its operation, command or control, requires an electric power supply, such a deicing or anti-icing device being fitted to each blade 1 to 5 and comprising a bundle of electrically conducting wires embedded in the blade near its leading edge, and the radially internal end of this conducting bundle emerges on the upper face of the blade, near its root 6, in the form of a deicing cable that groups together several elongate electric conductors.

For each of the blades 1 to 5, this connection installation comprises an electric connecting cable 30, comprising several elongate electrical conductors approximately parallel to one another, embedded in an electrically insulated jacketing matrix insulating the conductors from one another and itself at least partially surrounded by a mechanical protection jacket. This cable 30 is, at one end, in a radially inner position, connected to a first connector 31 fixed to a tubular central support 9c itself fixed to the central part of the hub 9 and supplied by an electrical power conducting cable 32 connected to the collector, so that the first connector 31 electrically connects the cable 30 to the power cable 32. At its other end, in a radially outer position, the cable 30 is connected to a second connector 33, fixed to a casing 34 bonded onto the top of the corresponding blade root 6, and electrically connected to the electrically conducting cable 35 of the electric deicing or anti-icing device of this blade, so that the cable 30 is electrically connected to this deicing cable 35 by the second connector 33.

The cable 30 essentially comprises three lengths 36, 37 and 38 in succession, of which a first length 36, radially towards the outside, which connects the second connector 33 to the second length of cable 37, in a radially intermediate position, and extending on the corresponding cuff 7 on the top plate 7a of which the length 37 is held substantially at its two ends, this second length 37 being itself connected to the first connector 31 via the third length 38, radially towards the inside.

The third length 38 is essentially produced as described in EP 0 754 623 and FR 2 781 198, that is to say in the form of an elongate piece of cable with a cross section in the shape of a flattened rectangle, the largest dimension of which extends substantially at right angles to the axis Z—Z, and one end of which, in a radially inner position, connects to the connector 31 via a coupling 39 of changing cross section, while its radially outer part is bent back on itself in the form of a flattened half loop forming an overhead hook 40, the concave side of which faces substantially towards the axis Z—Z and towards the spherical laminated stop 8 attaching the cuff 7 to the hub 9. This elongate piece of cable particularly forming the hook 40 may have an unscreened structure such as that of FIG. 2a of EP 0 754 623 and described with reference to that figure, with elongate electric conductors (copper wires) which are parallel, spaced apart, embedded in an insulating and elastically deformable jacketing matrix (elastomer or natural rubber), this matrix being contained between two strips of fabric constituting the large faces of the length 38. This particular structure and this particular arrangement afford significant advantages mentioned in the aforementioned patents, particularly those of allowing this third length 38 and, in particular, its overhead hook 40 to deform in terms of bending and torsion to accommodate the angular excursions of the oscillating mass consisting of the corresponding blade 1 to 5 and its cuff 7 in terms of pitch, flapping and drag, about the centre of the spherical laminated stop 8 and with respect to the hub 9.

In addition, the end 41 of the third length 38 which is the opposite end to the coupling 39 is connected to the radially inner end 42 of the second length 37, essentially as described in FR 2 781 198, that is to say by a coupling 43 held on the cuff 7 to which this coupling 43 is articulated by a connection 44, at least in terms of pivoting about a geometric axis x—x substantially parallel to the longitudinal axis X—X of the cuff 7 and of the corresponding blade 1 to 5 and extending in the substantially radial plane passing through the axes Z—Z and X—X. As described with reference to FIG. 1a of FR 2 781 198, this pivoting connection 44 comprises the coupling 43 constituting a support secured to one end of a pivot pin 45 coaxial with the axis x—x and mounted to swivel, preferably with the interposition of a self-lubricating bearing, inside a coaxial sleeve 46 fixed to a mounting plate 47 itself fixed, for example by screws, to the upper branch of the clevis 7c of the cuff 7, at the locking of the heads of the threaded studs of the assemblies 12 that connect the inner radial armature 8c of the spherical laminated stop 8 in the radially inner clevis 7c of the cuff 7.

Thus, the coupling 43, ensuring the mechanical and electrical continuity between the ends 41 and 42 of the lengths 38 and 37, is not influenced by the rotations of the sleeve 46 and of the mounting plate 47 with the cuff 7 about its pitch axis X—X.

This articulated connection 44 between the coupling 43 and the cuff 7 affords the significant advantages mentioned in the aforementioned French patent, particularly those further improving the mechanical and electrical integrity of the connecting cable 30, particularly by attenuating the mechanical stresses in the third length of cable 38, and correctly reacting the forces applied to this length 38 when the rotor is turning and when the blade with the corresponding cuff 7 makes angular movements in terms of pitch, at the frequency at which the blades are controlled in terms of pitch, which introduce torsional deformations at this frequency into the third length of cable 38. This articulated connection 44 in pivoting thus gives the connecting cable 30 a longer life.

As an alternative, as depicted in FIG. 2 of FR 2 781 198, the articulated connection 44 in pivoting can be replaced by an articulated connection of the ball joint type, to also improve the way in which the hook 40 accommodates angular excursions of the oscillating mass in terms of drag and in terms of flapping. In this case, a ball joint may be retained, on the one hand, about the pin 45 to which the support coupling 43 is secured and, on the other hand, inside the sleeve 46, so as to allow not only the overall pivoting of the ends 41 and 42 with the coupling 43 about the geometric axis x—x of the pin 45 with respect to the sleeve 46 and to the mounting plate 47 which are secured to the cuff 7 during the pitch movements of the latter, but also overall pivotings of the ends 41 and 42 with this ball joint, centred in a substantially radial plane passing through the axes Z—Z and X—X when the sleeve 46 and the mounting plate 47 are, together with the cuff 7, given angular excursions in terms of flapping and in terms of drag about the centre of articulation of the spherical laminated stop 8. An angular freedom of a few degrees in terms of drag and in terms of flapping, offered by the ball joint, is enough to very appreciably reduce the bending and torsional stresses that the lengths 38 and 37 of the connecting cable 30 may experience as a result of the drag and flapping movements of the blades, hence considerably extending the life of the cable 30.

The length of cable 37 is straight (see FIG. 3) and extends on the upper face of the upper plate 7a of the cuff 7 as far as its end 48, in a radially outer position, configured as a coupling of changing cross section located radially on the outside of the hook 40. The length of cable 37 has substantially the same cross-sectional shape of a flattened rectangle and the same unscreened structure as the length 38, which means that the central part of the length 37 is an elongate part, the largest dimension of the rectangular cross section of which is substantially perpendicular to the axis of rotation Z—Z when the cuff 7 is at rest. This length 37 does not extend radially along the cuff 7, but extends in a direction that is inclined with respect to the longitudinal axis X—X of the cuff 7, as shown in FIG. 3, and so that its radially outer end 48 is laterally offset outwards, preferably on the same side as that one of the two blade pins 15 which is furthest towards the front of the helicopter, in the case of blades which fold backwards. This length of cable 37 is connected to the cuff 7 at its inner end 42, by the articulated connection 43 described hereinabove, and at its outer end 48 by a second connection comprising, for example, a metal collar 49 surrounding a portion of the end 48 of changing shape of the length 37, this collar 49 being, for example, screwed by screws against the upper face of the cuff 7.

Via its end of changing cross section 48, the length of cable 37 is mechanically and electrically connected to one end 50, in a radially inner position, of the first length of cable 36 connecting the cuff 7 to the blade 1 to 5, being connected by its other end 51, in a radially outer position, to the connector 33 for connection to the deicing cable 35. To make the connection with the connector 33 easier, which connector may be of screened structure, the outer end 51 and the part directly adjacent to it of the length of cable 36 may be of circular cross section and have a screened structure. Between this outer end part 51 and the inner end 50, also shaped as a coupling of changing cross section, the length of cable 36 has an elongate part 52 which forms spare length and is wound in an S-shape around the two reels 15b of the two blade pins 15, going radially from the inside around substantially half the periphery of the reel 15b of that one of the two blade pins 15 which is the furthest back (on the side towards which the blade is folded), and going radially from the outside around substantially half of the periphery of the reel 15b of the other blade pin 15 furthest towards the front of the helicopter, this S-winding thus extending in a plane substantially perpendicular to the blade pins 15. This part 52 forming spare length has a cross section substantially in the form of a flattened rectangle, the largest dimension of which is substantially parallel to the blade pins 15 and therefore substantially perpendicular to the largest dimension of the substantially flattened rectangular cross section of the elongate part of the second length of cable 37 to which the part 52 forming spare length connects via its portion radially surrounding, from the outside, the corresponding reel 15b.

Each of the reels 15b comprises, at its axial end on the opposite side to the shank 15a of the corresponding blade pin 15, a rim 15c in the form of an annular flange projecting radially towards the outside of the reel 15b with respect to its axis. Thus, the portions of the part 52 which each pass around substantially half of a respective one of the reels 15b are restrained between the rims 15c of the reels 15b and the upper face of the upper branch of the outer clevis 7b of the cuff 7, which prevents any shifting of these cable portions substantially parallel to the blade pins 15.

In the flight position, the part 52 forming an S-shaped double loop is held in place by the two reels 15b which provide restraint not only parallel to the blade pins 15 as described hereinabove, between the cuff 7 and the rims 15c of the reels 15b, but also in a plane perpendicular to the blade pins 15, by virtue of the S-shape which prevents radial and tangential deformations of this part 52 of the length of cable 36.

By virtue of the fact that one of the reels 15b which is not on the side towards which the blade is folded has wrapped halfway around it radially towards the outside a portion of the part 52 forming spare length, it will be understood that withdrawal of this reel 15b with the blade pin 15 to which the reel is secured in order to allow the blade to pivot about the other blade pin 15 releases this portion of the part 52 which was wrapped radially towards the outside around the reel 15b now withdrawn, so that the entire length of cable 36 is now on the side towards which the blade is folded with respect to the blade pin 15 about which the blade pivots, as is the case of the blades 2 and 5 in FIG. 1. In consequence, the part 52 of the length of cable 36 can undergo great deformation while the corresponding blade is being folded, this being made easier by its cross section that is flattened parallel to the blade pins 15 in the region of the latter. The release of the loop projecting radially outwards in the S-wound portion of the part 52 by the withdrawal of a blade pin 15 and of its reel 15b in order to fold the blade back by pivoting about the other blade pin 15, and the ensuing arrangement of the entire length of cable 36 on the side of folding with respect to this other blade pin 15, which acts as pivot pin, allows the blade to be folded without disconnecting at the connector 33.

The same advantage is obtained with a variant embodiment in which the geometry of the connecting cable 30 on a cuff 7 and on the root 6 of the corresponding blade remains identical regardless, in particular, of which cuff 7 of the five cuffs 7 of the rotor is being considered.

When the blade is folded using a folding device with removable spacer piece 19, as described hereinabove, the sequence of folding is as described now with reference to FIGS. 4 to 6 in the case of the left-hand front blade 3, by way of example.

With the blade 3 initially in the flight configuration (FIG. 3), the starting point is to withdraw the blade pin 15 on the side towards which the blade 3 is to be folded, that is to say the blade pin 15 on the trailing edge side of the blade 3, or the blade pin 15 furthest towards the back, as the blade 3 is to be folded backwards. The blade 3 is then pivoted forwards, in the opposite direction to its final folded position, about the other blade pin 15 situated further forward, to bring the blade 3 substantially into the position of FIG. 4. The length of cable 36 can deform freely during this pivoting because it is still on the same side of the blade pin 15 acting as pivot. The deformation of this length of cable 36 is thus in the form of a single V-shaped or U-shaped loop, as depicted in FIG. 4. The journal 20 of the tooling spacer piece 19 is then positioned in that part of the clevis 7b that has been released by rotating the blade 3, and the two branches of the spacer piece clevis 22 are arranged on each side of that part of the blade root 6 which is no longer engaged in the clevis 7b. The tooling spacer piece 19 is thus arranged between part of the clevis 7b of the cuff 7 and part of the blade root 6. The journal 20 of the spacer piece 19 is then retained in terms of pivoting in the clevis 7b using the tooling pin 18 engaged in the first bore 21 of the spacer piece 19 and in the bores of the branches of the clevis 7b which previously had the withdrawn blade pin 15 passing through them, and the tooling pin 18 can be locked in the position for retaining the spacer piece 19 using an elastic pin 16, as depicted in FIG. 7. By pivoting the spacer piece 19 and the blade root 6 about, respectively, the tooling pin 18 and the blade pin 15 which acts as a pivot, and in the direction which brings them closer together, the spacer piece 19 and the blade root 6 can be positioned correctly for the insertion of the other tooling pin 18' into the bore 23 of the spacer piece clevis 22 and into the bore of the blade root 6 which initially had the now withdrawn blade pin 15 passing through it. The position occupied is therefore that of FIG. 5. The second blade pin 15, on the opposite side to the side towards which the blade 3 is to be folded, is then withdrawn, then, on the one hand, the blade 3 is pivoted via its root 6 in the clevis 22 of the spacer piece 19 until the blade root 6 comes into contact with a stop 24 formed in the end of the spacer piece clevis 22, so as to limit the relative rotation of the blade 3 and of the spacer piece 19 and, on the other hand, the spacer piece 19 is pivoted via its journal 20 in the clevis 7b until a stop 25 formed on the outer face of the branches of the clevis 22 comes into contact with one side of the clevis 7b, so as to limit the rotation of the spacer piece 19 with respect to the cuff 7. Through this double pivoting movement, the blade 3 is thus brought into the folded position of FIG. 6.

During the folding operation, successive withdrawal of the two blade pins 15 with their reels 15b automatically releases the previously S-wound part 52 of the length of cable 36. This release of the part 52 allows the blade 3 to travel without there being a need to disconnect the connector 33, in spite of the use of the removable spacer piece 19.

In the folded position of FIG. 6, the blade 3 is offset by the interaxis distance of the spacer piece 19 (that is to say by the distance separating the axes of its two bores 21 and 23) outwards, by comparison with conventional folding, such as that of the rear blades 2 and 5, without the proposed folding device, which allows the blade 3 to be spaced away from the hub 9 and from the cuff 7 of the blade 5 and from the adjacent drag damper 17.

The right-hand front blade 4 is folded back using a similar device, the only difference between it and the one described hereinabove being that the tooling spacer piece is symmetrical with that 19 of FIGS. 4 to 7. Errorproofing between the two tooling spacer pieces "left" (for blade 3) and "right" (for blade 4) may be provided by giving the spacer pieces different colour markings that are identical to the colour markings that may feature on the blades on which the tooling spacer pieces are intended to be mounted, in the case of a rotor with "indexed" blades entailing precise positioning of the rotor at rest and the matching of parts.

To improve the support and rotation of a blade root 6 in the spacer piece clevis 22, a stop 26 on which the blade can rest vertically is provided on the internal face of the lower branch of this clevis 22. This stop 26, made of a plastic, and annular, around the part of the second bore 23 which passes through the lower branch of the clevis 22, has the second tooling pin 18' retaining the blade root 6 in the spacer piece clevis 22 passing through it.

In the simplified example of FIG. 7, the tooling pin 18' comprises a cylindrical shank which externally is identical to the tubular cylindrical shank 15a of a blade pin 15, and a widened head for resting against the upper branch of the spacer piece clevis 22, so that the tooling pin 18' and a blade pin 15 can be substituted for one another for retaining and pivoting the blade root 6.

Figure 8:
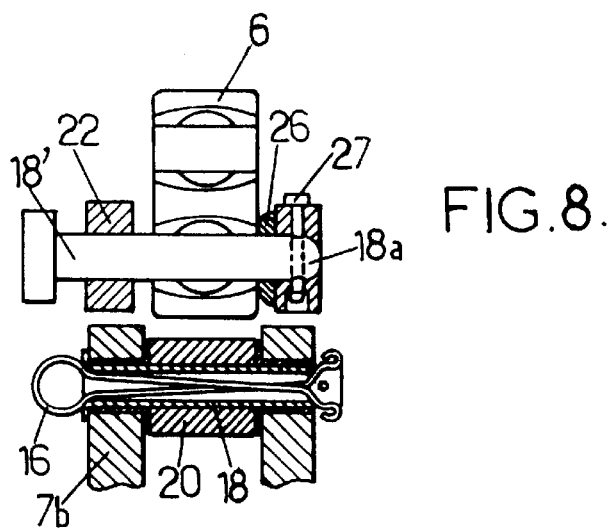
Figure 9:
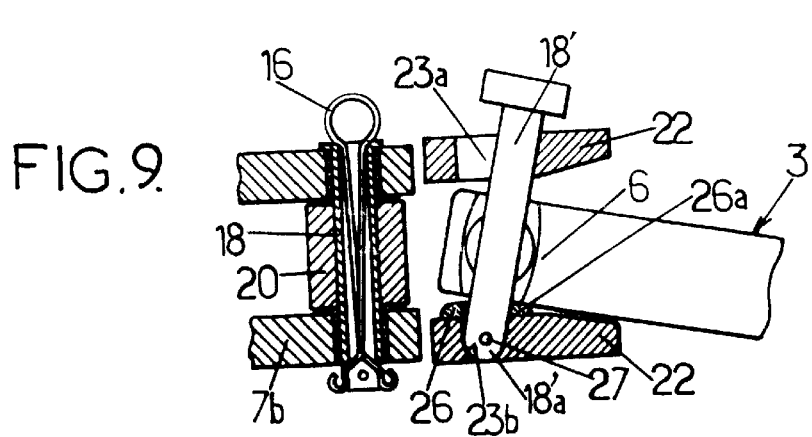

However, in order not only to separate the blade root 6 from the cuff 7, using the tooling spacer piece 19, when folding the front blades 4 and 5 back, but also to fold these blades 3 and 4 about an inclined axis of folding, so as to avoid any interference between these blades 3 and 4 and the rear blades 2 and 5 already folded back and the associated equipment, the second tooling pin 18' is a special-purpose pin. As depicted in FIGS. 8 and 9, the pin 18' passes through part 23a of the second bore, in the upper branch of the clevis 22, which is an oblong bore, visible in FIGS. 1 and 9, elongate substantially in a direction that is inclined with respect to the length of this upper branch of the clevis 22, while the part of the second bore which is formed in the lower branch of the clevis 22 is shaped as a spherical bearing surface 23b visible in FIGS. 8 and 9. The tooling pin 18' has a cylindrical shank ending in a spherical end piece 18'a which, when the pin 18' is fitted into the clevis 22, stops the pin 18' by bearing in the spherical bearing surface 23b. A safety pin or pin with ball detent 27, of known structure, is housed by an operator in a diametral bore passing through the spherical end piece 18'a and in a bore passing through the lower branch of the clevis 22 transversely, that is to say substantially at right angles to the major axis of the oblong bore 23a, as depicted in FIGS. 8 and 9, to retain the spherical end piece 18'a of the tooling pin 18' in the spherical bearing surface 23b. Thus, the tooling pin 18' can pivot about the axis of the safety pin or ball detent pin 27 with respect to the spacer piece 19. The maximum angle of rotation of the pin 18' , defined by the oblong bore 23a, is chosen so that the path of the blade 3 pivoting about the inclined tooling pin 18' does not interfere with other elements of the rotor head, particularly the cuff 7 and a drag damper 17 of an adjacent blade. The angle between the axes of the tooling pins 18 and 18' housed in the two bores of the spacer piece 19 can thus be modified, making it possible to give the blade a different inclination in order to alter its path. Accordingly, the annular stop 26 on the inner face of the lower branch of the spacer piece clevis 22 has an inclined surface 26a on which the blade can rest vertically when the latter is in the folded position. Likewise, that part of the inner face of the lower branch of the clevis 22 which is on the blade 3 side may be chamfered or bevelled with an inclination that corresponds to that of the blade pivoting about the inclined tooling pin 18'.

Thus, FIG. 1 shows that the front blades 3 and 4 are folded using devices according to FIGS. 8 and 9, the two front blades 3 and 4 being folded about inclined tooling pins 18' so that these blades follow a path which passes under the rear blades 2 and 5 and their associated components on the rotor, such as the cuff 7 and drag damper 17. The blades are unfolded (returned to the flight position) by performing the same operations in the reverse order.

In order for it to be possible to refit the blade pins 15 and their reels 15*b* easily and without the risk of error, the length of cable 36 and, in particular, its part 52 forming spare length, has an elastic jacket, possibly overmoulded, in the desired initial S-shape, so that this length of cable 36 naturally returns to the desired initial shape in which its flexible part 52 forms the S-shaped double loop.

In the variant in which the cables 30 are arranged identically on all the cuffs 7, when the front blades 3 and 4 are folded, which folding operations are performed according to the same sequence, a slightly different movement of the cable 30 and, in particular, of the part 52 of its first length 36 may be observed depending on whether the blade 3 is folded on the left or the blade 4 is folded on the right. At the same time, the tooling spacer pieces 19 may be differentiated merely by markings identifying "LEFT" and "RIGHT" or alternatively "LEFT TOP" and "RIGHT TOP" if it is desirable to avoid incorrect positioning of a spacer piece 19 according to whether it is offered up with its upper face or its lower face topmost or conversely bottommost, although then the fitting of the tooling pin 18' and of the safety pin or ball detent pin 27 is particularly difficult if the oblong bore 23*a* is on the lower side.

Figure 10:
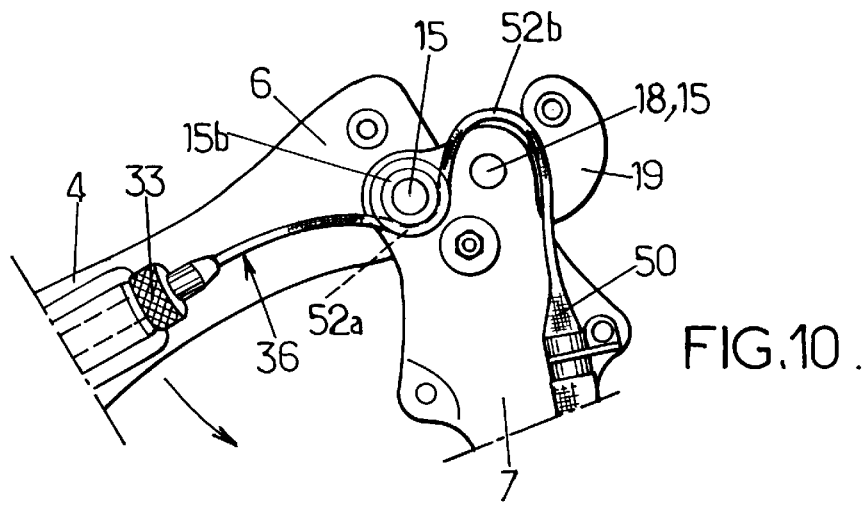
Figure 11:
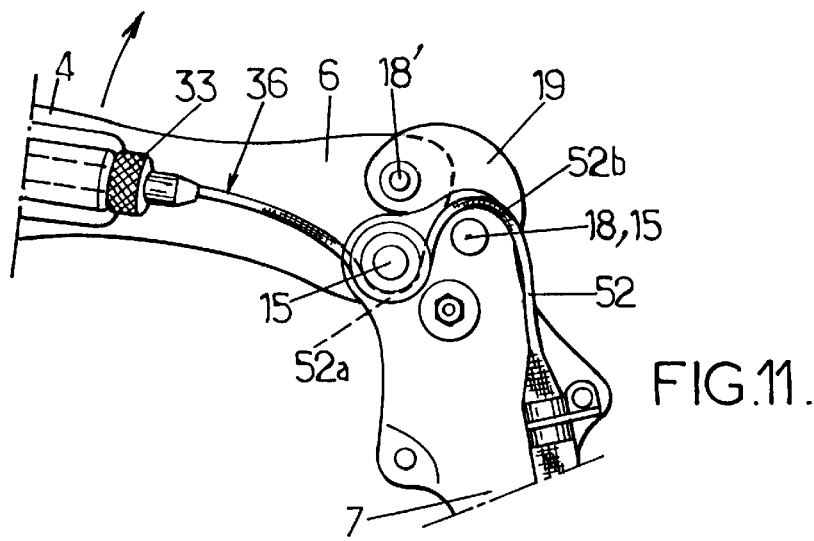
Figure 12:
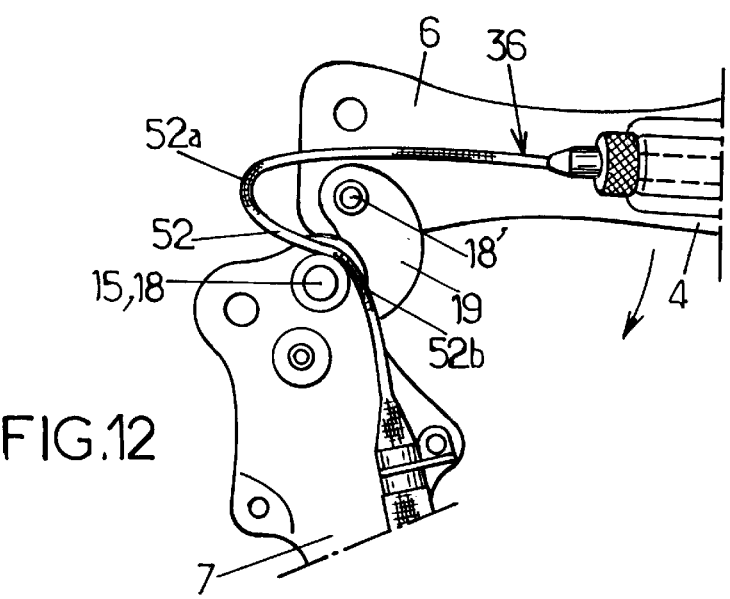

FIGS. 10, 11 and 12, which correspond respectively to FIGS. 4 to 6, but in the case of the front blade 4 folded to the right, show the slightly different movement of the length of cable 36 for the right-hand blade 4 by comparison with the movement of the length of cable 36 for the left-hand blade 3. In particular, FIG. 10 shows that the part 52 forming spare length has a portion 52*a* restrained by the reel 15*b* of the single blade pin 15 connecting the blade 4 to the cuff 7 while the spacer piece 19 is being fitted on the cuff 7, and a portion 52*b* forming a loose loop radially on the outside and around the tooling pin 18 connecting the spacer piece 19 to the cuff 7. In the next position, in FIG. 11, when the root 6 of the blade 4 is connected to the spacer piece 19 by the tooling pin 18', the portion 52*b* of the spare length 52 now forms a tight loop on the outside around the tooling pin 18 or possibly the other blade pin 15 refitted to connect the spacer piece to the cuff in the previous position of FIG. 10. At the end of folding to the right, in FIG. 12, it can be seen that the portion 52*b* of the spare length 52 now forms a portion of cable which is restrained by the reel 15*b* of the blade pin 15 or the tooling pin 18 whereas the other portion 52*a* of this part 52 forms a large loop on the outside of the tooling pin 18' once the other blade pin 15 has been withdrawn, freeing the root 6 of the blade 4 from any connection with the cuff 7 to allow the blade root 6 to pivot in the clevis of the spacer piece 19 and allowing the latter to pivot in the clevis of the cuff 7.

The same advantages are thus obtained when folding the right-hand and left-hand blades backwards independently of these slightly different movements of the first length of cable 36.

In this way, any intervention on the connectors 31 and 33 during blade folding are avoided, thus eliminating wear of these connectors and above all the risk of damage. The presence of an electric deicing or anti-icing device on the blades therefore leads to no additional intervention during blade folding or unfolding operations, because the release of the part 52 forming spare length takes place automatically when the operator withdraws the blade pins 15 and therefore the reels 15*b* secured to them.

What is claimed is:

1. A rotorcraft rotor, comprising:
   a hub intended to be driven in rotation about an axis of the hub which is the axis of rotation of the rotor,
   at least three blades, each of which is connected to the hub by a connecting member which is substantially radial with respect to the axis of rotation, and an outer radial end of which is shaped as a clevis in which a corresponding blade has a root retained by two blade pins each passing through aligned bores in the clevis and the blade root, the two blade pins being substantially mutually parallel, at least one blade being foldable on one side of the rotorcraft and having at least one removable blade pin, so that withdrawal of said removable blade pin from the blade root and from the clevis of the connecting member allows the blade to be pivoted about the other blade pin, and
   an electrical connection installation comprising, for each blade, at least one electrical connecting cable connecting a first connector, carried by the hub and powered by at least one supply conductor, to a second connector fixed on the blade and connected to at least one electric conductor of an electric device for deicing or preventing the icing of said blade,
   wherein the connecting cable for at least one folding blade comprises a first length connecting said second connector on said folding blade to a first end, in an outer radial position, of a second length held on the corresponding connecting member of said connecting cable, said first length of which includes a part forming spare length and wound into an S-shape in a plane substantially perpendicular to the corresponding two blade pins around two reels each of which is mounted at an end of a respective one of the corresponding two blade pins so that withdrawal of at least one removable blade pin and of the corresponding reel releases at least a portion of said part forming spare length of said first length, allowing the blade to be folded back without disconnection at the second connector.

2. A rotor according to claim 1, wherein at least one folding blade has both blade pins as removable pins and can be folded manually with the aid of a removable spacer piece which spaces the root of said folding blade away from the corresponding connecting member, the spacer piece comprising a journal through which a first bore passes and a clevis with a second bore, the spacer piece being, once a first blade pin and its reel have been withdrawn and the blade has been pivoted with respect to the connecting member and about the second blade pin, able to be mounted in terms of rotation on the connecting member by the retaining of the spacer piece journal in the clevis of the connecting member using a pin that can be engaged in the first spacer piece bore and in the bore, previously containing the first blade pin, of the clevis of the connecting member, and the spacer piece being capable of retaining the blade root in terms of rotation in the spacer piece clevis by engaging another pin in the second bore of the spacer piece and in the bore of the blade root which previously contained the first blade pin, so that, once the second blade pin and the corresponding reel have been withdrawn, the blade can be folded by pivoting its root in the spacer piece clevis and by pivoting the spacer piece via its journal in the clevis of the connecting member, said part forming spare length being completely released by the successive withdrawal of the two reels with the corresponding two blade pins.

3. A rotor according to claim 1, wherein said first length of connecting cable has, at least in said part forming spare length, a cross section which is substantially in the shape of a flattened rectangle, the largest dimension of which is substantially parallel to the blade pins.

4. A rotor according to claim 3, wherein that the second length of cable has an elongate part with a cross section substantially in the shape of a flattened rectangle, the largest dimension of which is directed substantially at right angles to the largest dimension of the substantially flattened rectangular cross section of the part forming spare length of the first length of cable.

5. A rotor according to claim 1, wherein said second length of connecting cable extends on said connecting member, in a direction that is inclined with respect to the longitudinal axis of said connecting member and in such a way that its first end, in an outer radial position, is laterally offset outwards, on the same side as that one of the two reels which has wrapped around it the portion of said part forming spare length to which said second length of connecting cable is connected.

6. A rotor according to claim 1, wherein each reel, of cylindrical overall external shape, is secured to a respective one of the two blade pins.

7. A rotor according to claim 1, wherein each of the two reels has, at its end on the opposite side to the blade pin on which said reel is mounted, a rim projecting substantially radially towards the outside of said reel and which restrains said part forming spare length and wound in an S-shape, between the rims of the reels and the corresponding connecting member, against any displacement substantially parallel to the blade pins.

8. A rotor according to claim 1, wherein each reel is tubular and secured substantially coaxially to the corresponding blade pin which is also tubular, and accommodates an head of an elastic pin passing through said blade pin to lock it in a position in which it retains the blade root in the clevis of the corresponding connecting member in the flight configuration.

9. A rotor according to claim 1, wherein said second length of the connecting cable is connected to the first connector on the hub via a third length of the connecting cable, said third length comprising an overhead hook in the shape of a flattened half loop with a cross section substantially in the shape of a flattened rectangle the largest dimension of which is substantially perpendicular to the axis of rotation and the concave face of which faces substantially towards the retaining and articulating means connecting the corresponding connecting member to the hub and substantially radially towards the axis of rotation, said overhead hook being thus deformable in terms of bending and in terms of torsion so as to accommodate angular excursions in terms of pitch, drag and flapping of the blade and of its connecting member for connecting it to the hub.

10. A rotor according to claim 9, wherein the second length of cable is connected to the overhead hook of the third length of cable by a coupling connected to the connecting member by a connection which is articulated at least in terms of pivoting about an axis substantially parallel to the longitudinal pitch-change axis of the connecting member and of the blade.

* * * * *